April 11, 1961  J. SELZER  2,979,214
POWER ACTUATED END GATE ELEVATOR FOR MOTOR VEHICLES
Filed Jan. 22, 1958  2 Sheets-Sheet 1
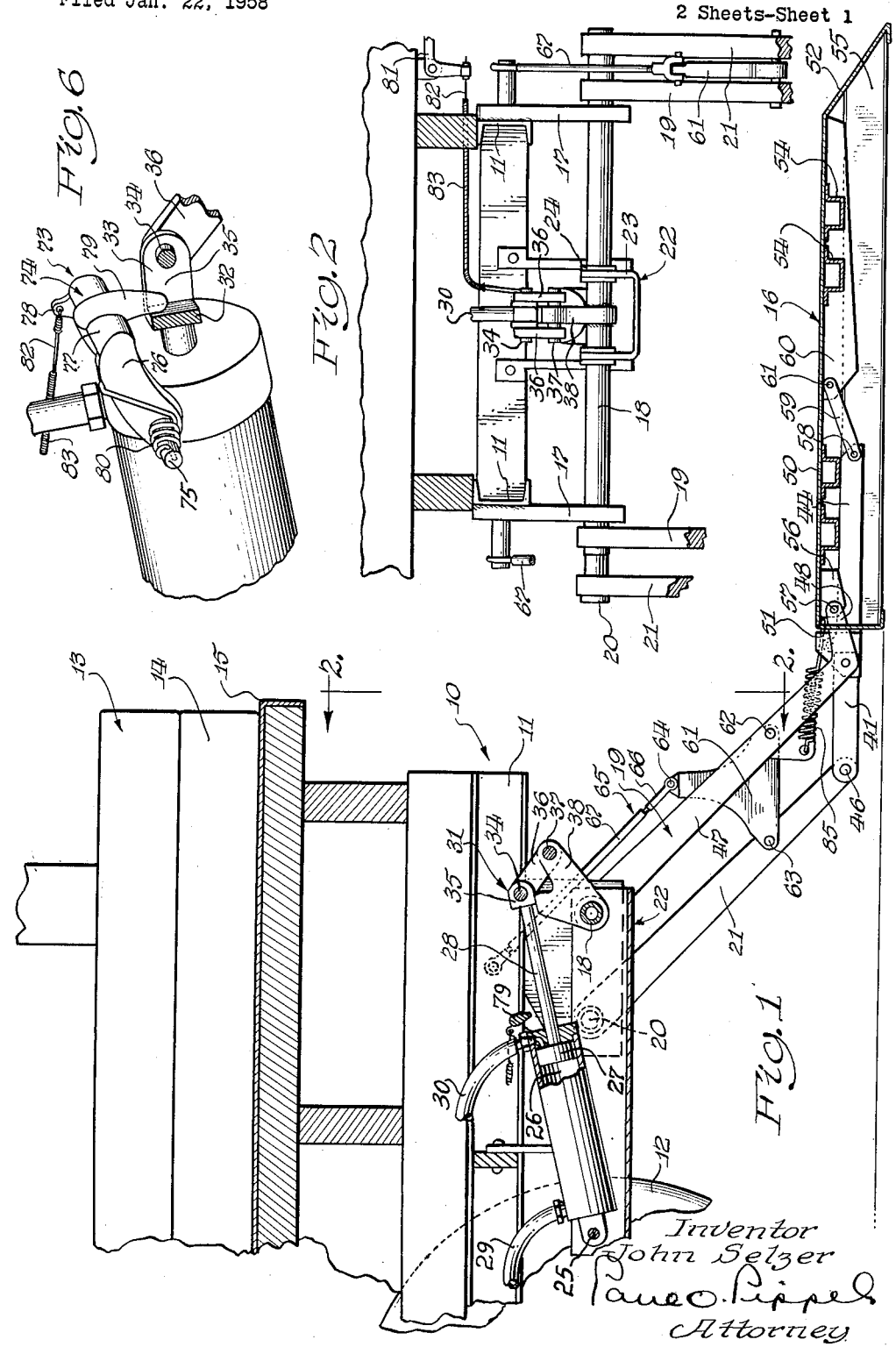

April 11, 1961 J. SELZER 2,979,214
POWER ACTUATED END GATE ELEVATOR FOR MOTOR VEHICLES
Filed Jan. 22, 1958 2 Sheets-Sheet 2
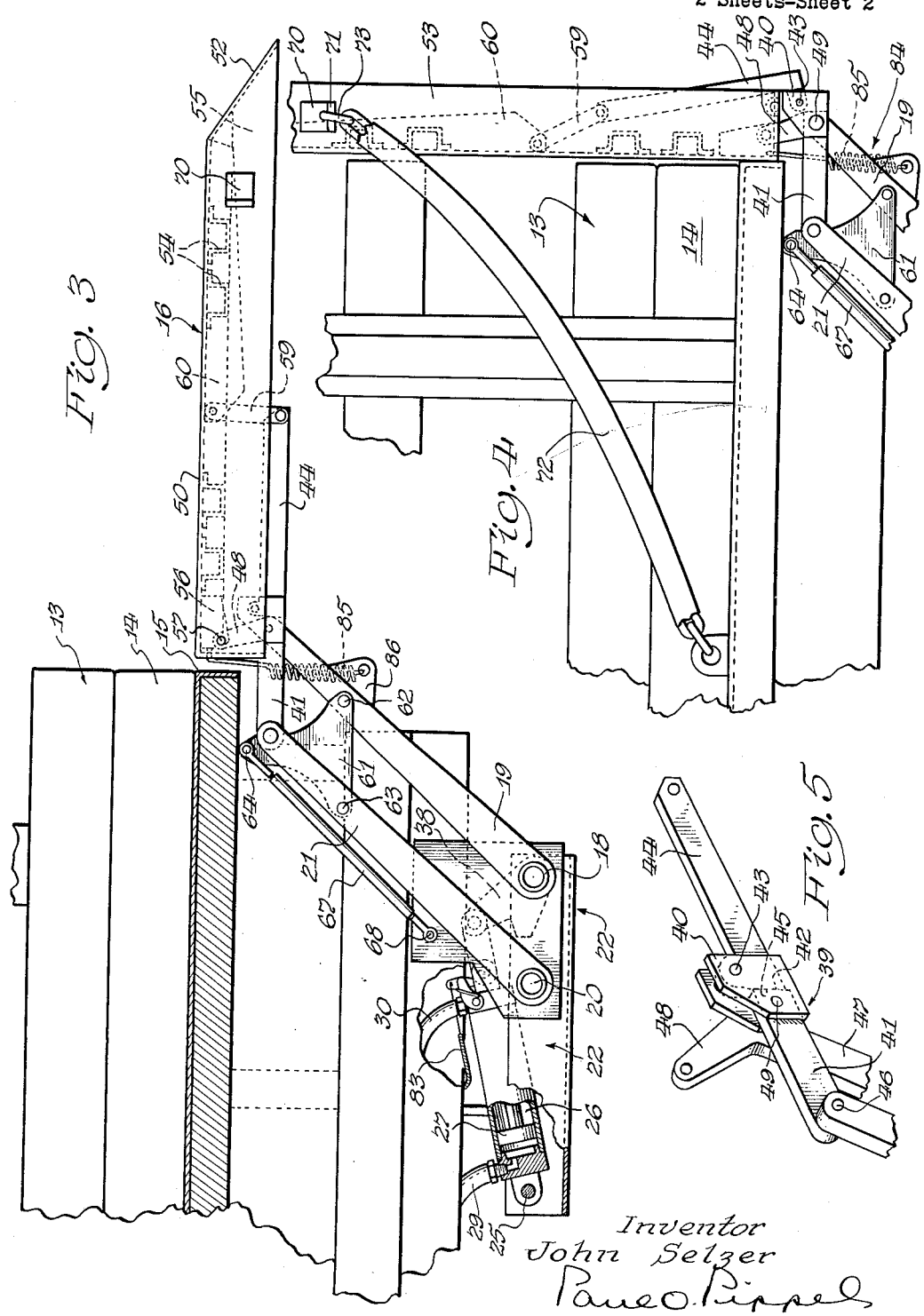
Inventor
John Selzer
Paul O. Pippel
Attorney United States Patent Office 2,979,214
Patented Apr. 11, 1961

2,979,214
POWER ACTUATED END GATE ELEVATOR FOR MOTOR VEHICLES

John Selzer, 15021 Aboite Center Road, Fort Wayne, Ind.

Filed Jan. 22, 1958, Ser. No. 710,570

3 Claims. (Cl. 214—77)

This invention relates to power actuated end gate elevators for motor vehicles and more particularly to a new and improved combination load-carrying platform and end gate member, and means for moving the member vertically while disposed horizontally to facilitate loading and unloading of the vehicle body with which it is associated.

An important object of the present invention is the provision of a power-actuated elevating end gate structure connected to the vehicle body in such a manner that the stresses developed in the structure during the elevating operation are not transmitted to the vehicle body to adversely affect the same.

A still further object is the provision of a relatively light weight but sturdily constructed power-actuated end gate elevator for motor trucks which may be readily adapted to the truck chassis of various manufacturers without the necessity of extensive modification of the motor vehicles.

Still another object is the provision of a novel releasable lock means for locking the end gate elevator in its fully raised position.

The foregoing and other important objects and desirable features inherent in and encompassed by the invention together with many of the purposes and uses thereof will become readily apparent from a reading of the ensuing description in conjunction with the annexed drawings in which:

Figure 1 is a side elevational view of the rear portion of a motor truck having the invention mounted thereon; certain parts of the invention are in section to better illustrate the same and the combination end gate and load-carrying platform is shown in the position to receive cargo thereon at ground level;

Figure 2 is an end view partially in section taken along line 2—2 of Figure 1;

Figure 3 is a view similar to Figure 1 except that the elevating end gate is shown in the fully raised position;

Figure 4 is a fragmentary side elevational view of the elevating end gate structure in its raised and body enclosing position;

Figure 5 is a fragmentary perspective view of a hinge support link and the part connected thereto; and Figure 6 is a fragmentary detail view of the manually operable lock means.

Referring to the drawings in detail, wherein like reference characters represent like elements throughout the various views, the invention is shown in conjunction with a conventional motor truck chassis frame 10 which includes a pair of transversely spaced, longitudinally extending side sill members 11. The chassis frame 10 is supported upon and driven by rear wheels 12 (a portion of one is partially shown in Figure 1) and a body 13, in turn, is supported by the chassis frame 10 by means of transversely extending longitudinally spaced cross bolsters interposed between and attached to the body 13 and the chassis frame 10 in a conventional manner. The vehicle body 13 has vertical side walls 14 interconnected by a floor or bed 15. The rear end of the body 13 is open and is adapted to be closed by a combination load-carrying platform and end gate 16.

Attached to each side sill member 11 adjacent the rearwardmost end thereof is a mounting plate 17. The plates 17 are rigidly affixed to the side sill members 11 by means of nuts and bolts (not shown) and are arranged to be in transverse alignment. Portions of the brackets 17 depend below the side sill members 11 and are provided with bearings for rotatably supporting a tubular rock shaft 18. Rigidly secured as by welding to the end portion of the shaft 18 projecting outwardly transversely from each plate 17 is one end of an elongated lifting arm 19. Each plate 17 also carries a transversely extending pivot pin 20, the axis of which is horizontally spaced forwardly and parallel to the rocking axis of the shaft 18. The axes of the pivot pins 20 are in transverse alignment and lie in a horizontal plane containing the pivotal axis of the shaft 18. One end of a stabilizing arm 21 is mounted on each pivot pin 20.

Extending longitudinally and disposed substantially along the medial line of the chassis frame 10 is a channel-shaped support frame 22. Vertical legs 23 are provided with bearings 24 through which the rock shaft 18 extends. Suitable means such as hanger brackets or the like (not shown) are preferably employed for supporting the forward end of the frame 22 from the chassis frame 10. The forwardmost end of the frame 22 is provided with a transverse pivot pin 25 to which one end of a hydraulic cylinder 26 is connected. It is to be understood that while hydraulic means for raising and lowering the combination load-carrying platform and end gate 16 are to be described hereinafter in detail, other power producing means such as an electric motor may be utilized without departing from the spirit and scope of the invention. A piston head 27 is slidably mounted within the cylinder 26 and has a piston rod 28 secured thereto. The piston rod 28 projects rearwardly from the rear end wall of the cylinder 26. Pressure fluid is furnished to the hydraulic system by a pump (not shown) which is driven by the vehicle engine or some other power take-off means on the vehicle. Conduits 29 and 30 lead to and from the pump and operably interconnect the pump with the cylinder 26. Valve means (not shown) are provided for controlling the admission of fluid under pressure to the cylinder 26 and the exhausting of fluid therefrom whereby the piston head 27 can be moved longitudinally with respect to the cylinder 26. Longitudinal movement of the piston 27 effects longitudinal movement of the piston rod 28. The outer end of the piston rod 28 is in the form of an enlarged bifurcated block 31. The web 32 of the bifurcated block 31 is rigidly secured to the outer end of the piston rod 28 by suitable means such as welding and the legs 33 thereof extend longitudinally as shown in Figures 1 and 6. A transversely extending pivot pin 34 is carried by the legs 33. It will be noted that the pin 34 is longitudinally spaced from the web 32 to provide a space 35 therebetween for a purpose which will be pointed out hereinafter. The ends of the pin 34 project outwardly from the legs 33 and are each secured to one end of a link 36. As best shown in Figure 2 the links 36 are transversely spaced and each link has an end thereof connected to a pivot pin 37. A crank arm 38 is rigidly secured as by welding to the rock shaft 18 substantially midway between the bearings 24 and has an end thereof pivotally connected to the pin 37. From the foregoing, it will be appreciated that forcing of the piston 27 forwardly as viewed in Figure 1 by the admission of fluid under pressure through the conduit 30 to the cylinder 26 effects rocking of the shaft 18 and swinging of the lifting arms 19 which are secured thereto. Inasmuch as both ends of the piston and cylinder assembly are connected to the support frame 22 all of the stresses and strains developed during the raising and lowering operation of the combination load-carrying platform and end gate 16 are contained within the frame 22 and are not transmitted to the vehicle chassis frame 10 or the vehicle body 13 to damage the same. Consequently the hanger support means for connecting the frame 22 to the chassis frame 10 need be only strong enough to support the weight of the frame 22 and the components described hereinbefore mounted thereon.

The ends of the lifting arms 10 and stabilizing arms 21 opposite their connections with the mounting plates 17 are interconnected by means of a pair of hinging brackets, designated generally by numeral 39. As best shown in Figure 5, the hinging bracket 39 includes a pair of substantially flat plates 40 having an elongated bar 41 sandwiched thereinbetween which is rigidly affixed to the plates by means of welding or the like. Inasmuch as the hinging bracket 39 and the various connections thereto on each side of the vehicle are the same, the detailed construction and description of one hinge bracket 39 will suffice. Portions of the plates 40 extend beyond the rearwardmost edge 42 of the elongated bar 41 and such spaced parallel portions carry a pivot pin 43 adjacent the uppermost edges thereof. The pivot pin 43 provides a means for connecting one end of a hinging arm 44 to the hinging bracket 39. The forwardmost edge 45 of the hinging arm 44 is flat and is adapted to abut the flat rearwardmost edge 42 of the bar 41 disposed between the plates 40. The flat edge 42 serves as a stop abutment for limiting pivotal movement of the hinging arm 44 in a clockwise direction as viewed in Figure 1. When the edges 42 and 45 are in engagement the arm 44 extends rearwardly substantially horizontally from the bracket 39. The end of the stabilizing arm 21 opposite the pivot pin 20 is pivotally connected to the forwardmost end of the bar 41 by means of a pivot pin 46. As shown in Figure 1 the lifting arm 19 is formed with a relatively long straight section 47 and a relatively short section 48 angularly disposed with respect to the long section. A transversely extending pivot pin 49 carried by the hinging bracket 39 is utilized to pivotally connect the lifting arm 19 at the juncture of the long section 47 and the short section 48 to the hinging bracket 39. The pivot pin 49 is horizontally spaced rearwardly of the pivot pin 20 and as a result the stabilizing arm 21, lifting arm 19, hinging bracket 39 and the mounting bracket 17 form a parallelogram. Thus since a parallelogram linkage is provided swinging of the lifting arms 19 by rocking of the shaft 18 effects simultaneous movement of the stabilizing arm 21 and the hinging bracket 39. It will be appreciated that the horizontally aligned relation of the pivot pins 46 and 49 remains the same during such movement of the arms 19 and 20.

The combination load-carrying platform and end gate 16 is in the form of a rectangular box-like structure having a top wall 50 longitudinally spaced end walls 51, 52 and transversely spaced side walls 53 made of heavy sheet metal or the like. Four transversely extending channel members 54 are welded to the underside of the top wall 50 to strengthen the same and afford rigidity to the end gate 16. Rigidly fastened to the underside of each channel member 54 and the longitudinally spaced end walls 51 and 52 are three transversely spaced U-shaped members 55. Rigidly connected to the underside of the top wall 15 is a hinge element 56 which is provided with an aperture through which a pivot pin 57 carried by the free end of the relatively short section 48 of the lifting arm 19 extends. Suitable lock nut means (not shown) is threaded on the pivot pin 57 to maintain the pivotal connection of the hinge element 56 and lifting arm 19. It is to be understood that the wall 51 is provided with suitable cut-out portions to permit the relatively short sections 48 of the lifting arms 19 and the hinging arms 44 to extend through the wall 48 as shown in Figure 1.

Pivotally connected to the rearwardmost end of the hinging arm 44, as viewed in Figure 1, by means of a pivot pin 58 is one end of a support link 59. The opposite end of the support frame 59 is pivotally connected to a bearing support 16 by means of a pivot pin 61. The bearing support 60 is rigidly secured to the underside of the top wall 15. The hinging arm 44 and support link 59, in effect, define brace means for the end gate 16.

During the raising and lowering operation the lifting arms 19 and the stabilizing arms 21 will pass over center relative to each other. That is, the pivotal connection of the lifting arm 19 and the stabilizing arms 21 to the vehicle and the pivot pins 46 and 49 will be disposed in a common horizontal plane and when the lifting and stabilizing arms reach such a position they will normally tend to buckle or move out of parallelogram relationship if means are not provided to maintain this relationship. In the present invention the parallelogram relationship is maintained by employing a triangular-shaped plate 61 having one corner thereof pivotally connected to the lifting arm 19 by means of a pivot pin 62 and another corner thereof pivotally connected to an associated stabilizing arm 21 by means of a pivot pin 63. The spacing between pivot pins 62 and 63 is substantially equal to the spacing between pivot pins 46 and 49 and a plane containing pivot pins 62 and 63 is substantially parallel to a plane containing the pivot pins 46 and 49. A pivot pin 64 is utilized to attach one end of a stabilizing link 65 to a corner of the triangular plate 61. The stabilizing rod or link 65 includes a clevis 66 having a bifurcated end portion embracing the uppermost corner of the triangular plate 62 as viewed in Figure 1. The pivot pin 64 extends through the bifurcated portion of the clevis 66. The clevis 66 is provided with a threaded end portion which is received in the internally threaded end of a tubular link element 67. The end of the tubular link element 67 opposite the threaded end is pivotally mounted on a pivot pin 68 carried by the mounting plates 17.

From the foregoing it will be appreciated that the length of the stabilizing link or rod 65 may be adjusted by removing one of the pivot pins 68 or 64 and thereafter rotating the clevis 66 with respect to the tubular link element 67. A lock nut, not shown, is threaded on the clevis 66 for maintaining the adjusted length of the stabilizing rod. It will be appreciated that the length of the stabilizing rod 65 may be adjusted to have a length substantially equal to the length of the lifting arm section extending between the pivot pin 62 and the rockshaft 18. It will also be noted that the spacing between the pivot pin 68 and the rocking axis of the shaft 18 is substantially the same as the spacing between the pivot pin 64 and the pivot pin 62 and furthermore a plane containing the pivot pin 68 and the rocking axis of the shaft 18 is substantially parallel to a plane containing the pivot pin 62 and 64. As a result the stabilizing rod 65 mounting bracket 17, triangular plate 61 and the section of the lifting arm 19 extending between the rockshaft 18 and the pivot pin 62 forms a parallelogram linkage system. It will be appreciated that inasmuch as the pivot pin 68 is vertically spaced above the axis of the rockshaft 18, the second mentioned parallelogram linkage system will not lie in a common horizontal plane at the same time that the first mentioned parallelogram linkage system including the stabilizing arms 21 is in a common plane. Thus the first parallelogram linkage system, which includes the lifting arm 19 and the stabilizing arm 21, is maintained by the second parallelogram system, which includes the stabilizing rod 64 and plate 61, even when the lifting and stabilizing rods are passed over center and therefore positively prevent any buckling of the lifting and stabilizing arms during the raising or lowering movement. Furthermore, since the length of the rod 65 is adjustable, a quick and inexpensive means is provided for accurately obtaining the correct relationship of the links of the second parallelogram linkage system to thus compensate for any manufacturing inaccuracies present when the elevator is first installed on a motor vehicle or other unwanted changes which subsequently develop in the linkage relationship after the elevator has been in use due to wear or damage of the parts of the parallelogram system. In use the combination load-carrying platform and end gate 16 and the structure described hereinbefore associated therewith is substituted for the conventional end gate of the vehicle. When the combination load-carrying platform and end gate 16 is functioning as a conventional end gate to close the rear opening in the truck body 13, latch means similar to the latch means used with conventional end gates is provided for locking the member 16 in its body-closing position. Latch means used with conventional end gates usually includes a bracket secured to each side of the vehicle body which brackets are provided with laterally projecting extensions having apertures therethrough. Inasmuch as the body 13 shown in the drawings is of the stake-type such brackets are not shown. However each lateral side of the member 16 is provided with an L-shaped bracket 70 having a laterally extending leg 71 provided with an aperture alignable with a respective aperture formed in the bracket extension carried by a side of the vehicle body if the body is of the solid wall type. When the member 16 is in its vertical body closing position, as illustrated in Figure 4, a chain 72 having one end secured to the body 13 has its other end provided with a latch 73' which is adapted to extend through the aperture formed in bracket 70 and the aligned aperture of the bracket secured to the side wall of the body if such is provided thereon to releasably secure the members 16 to the vehicle body 13.

The present invention contemplates the provision of additional means for positively locking the combination end gate and load-carrying member 16 in its fully raised position as shown in Figure 4. The additional latch means is designated by numeral 73 and includes a latch member 74. As shown in Figure 2 the rearwardmost end of the hydraulic power cylinder 26 is provided with a pair of diametrically disposed oppositely extending pivot pins 75 which are adapted to extend through apertures formed in the ends of a pair of laterally spaced arms 76 of the latch member 74 whereby the latch member 74 is pivotally supported on the cylinder 26. The ends of the arms 76 opposite their connections to the pivot pins 75 are integrally formed with a transversely extending section 77. Integrally formed with the section 77 and substantially midway between the arms 76 is an upwardly extending tab 78 having an aperture therethrough and a downwardly depending latch bolt 79. The tip portion of the latch bolt 79 is capable of being inserted in the space 35 between the pin 34 and the web 32 and between the legs 33 of the bifurcated block 31. When the piston 27 is in its fully retracted position as shown in Figure 3 which position of the piston corresponds to the fully raised position of the combination load-carrying platform and end gate 60, it will be appreciated that when the latch bolt 79 is in the position shown in Figure 6 wherein the tip portion thereof engages the web 32 of the lock 31 secured to the outer end of the piston rod 28, the piston 27 is incapable of being moved to its expanded position and consequently the rockshaft 18 is locked and incapable of rotating in the direction to lower the combination load-carrying platform and end gate 16. It will thus be appreciated that a simple device is provided for positively locking the combination load-carrying platform and end gate structure 16 in its fully raised position. In many prior end gate elevator structures the end gate is maintained in its fully raised position by the hydraulic fluid acting on the piston to maintain it in its retracted position. Obviously the cylinder 26 is continually subjected to internal pressure whenever the end gate structure is in its fully elevated position. When locking device 73 is incorporated in the end gate elevator structure the cylinder 26 may be relieved of internal pressure since the piston rod 28 will be positively locked in its retracted position regardless of the pressure existing in the cylinder 26. In order to maintain the latch bolt 79 in its locked position with respect to the web 32 and to prevent the latch bolt from being dislodged from engagement with the web 32 when the vehicle is being used, a spring 80 mounted on one of the pivot pins 75 is provided which has an end thereof reacting against one of the arms 76 to bias the latch member 74 to its latched position. In order to release the latch member 74 from engagement with the web 32 when it is desired to lower the combination load-carrying platform and end gate 16 it is merely necessary to rock a bellcrank 81 mounted on one side of the vehicle body 13 where it may be conveniently operated by the user in a direction to pull a wire 82 having one end attached to the bellcrank 81 transversely outwardly as viewed in Figure 2. Wire 82 is disposed within a fixed and flexible sheathing 83 and has the end thereof opposite the connection attached to the bellcrank 81 extending through the aperture formed in the upstanding ear or tab 78 and connected to the ear 78. Thus when the bellcrank 81 is manually rocked in a counterclockwise direction as viewed in Figure 2 the latch member 74 is rocked in a counterclockwise direction as viewed in Figure 6 against the biasing action of the spring 80 to a released position as shown in Figure 1 wherein the tip of the latch bolt 79 is removed from the space 35 and out of the path of movement of the block 31. Suitable means (not shown) are provided for releasably locking the bellcrank in the position thereof corresponding to the released position of the latch member 74.

When it is desired to load the vehicle body 13 with objects which are disposed at a level vertically below the level of the truck bed 15 without the need of manually lifting the objects to the level of the truck bed the member 16 is brought to the level of the object or objects. Assuming that it is desired to raise an object from ground level the member 16 is placed in position shown in Figure 1 and while in this position the material or object to be loaded is placed on the combination load-carrying and end gate member 16. Fluid pressure is then directed through conduit 30 to the cylinder 28 to force the piston 27 forwardly drawing the piston rod 28 into the cylinder 26. Piston rod 28 being connected to the crank arm 38 through the intermediary of link 36 effects swinging movement of the lifting arms 19 in a counterclockwise direction as viewed in Figure 1. Inasmuch as the stabilizing arms 21 and hinging brackets 39 are a part of the same systems as the lifting arms 19, the stabilizing arms 22 and the hinging brackets 39 move simultaneously in the same direction with the lifting arms. It will also be appreciated that the plates 61 and stabilizing rods 65 being parts of parallelogram systems involving the lifting arms 19 also simultaneously move in the same counterclockwise direction. Simultaneous rocking movement in a counterclockwise direction of the arms 19 and 21 continues until the short section 48 of the lifting arms 19 are substantially vertically disposed and the top wall 15 of the end gate 16 lies in a horizontal plane containing the floor 15 of the truck body 14 as shown in Figure 3. The load elevated by the end gate 16 is then pushed from the end gate into the body 13 of the vehicle and the end gate 16 may then be lowered again by conditioning the valve means in such a manner that fluid within the cylinder is allowed to drain through the conduit 30. It will be appreciated that the end gate 16 remains in the horizontal plane during the elevating movement and the surfaces 45 of the arms 44 remain in abutting engagement with the surfaces 42 of the hinging bracket 39. When the loading or unloading operation is completed bellcrank 81 is unlocked to permit the spring 80 to pivot the latch member 74 to its locked position wherein the latch bolt 79 is disposed within the space 35 and engages the web 32 of the block 31. Thereafter the end gate 16 is pivoted about the pivot pin 57 to the vertical position shown in Figure 4 to close the opening at the rear end of the truck body 13 and latched in this position by the latch means which include the chain 72. In order to reduce the effort required on the part of the operator to pivot the end gate 16 from its horizontal position to its vertical position. A counterbalancing spring device, designated generally by numeral 84, is provided on each transverse end of the end gate 16. Each counter-balancing spring device includes a helically wound spring 85 which has one end attached to an ear 86 rigidly affixed to a respective lifting arm 19. The opposite end of the spring 85 is connected to the end wall 51 of the end gate structure. The size of the spring 85 is such that when the end gate 16 is in the position shown in Figure 3 the spring is under tension and because the connection of the spring to the wall 51 is at a point spaced from pivotal axis of the end gate structure 16 the spring yieldably urges the end gate 16 in a counterclockwise direction as viewed in Figure 3 or toward its vertical or body-closing position. Thus part of the force required to lift the end gate structure from the position shown in Figure 3 to the position shown in Figure 4 is supplied by the springs 85.

The embodiment of the invention chosen for the purposes of illustration and description herein is that preferred for achieving the objects of the invention and developing the utility thereof in a most desirable manner due regard being had to existing factors of economy, simplicity of design and construction and the improvements sought to be effected. It will be appreciated therefore that the particular structural and functional aspects emphasized herein are not intended to exclude but rather to suggest such other modification and adaptations of the invention as fall within the spirit and scope of the invention as defined in the appended claims.

What is claimed is:

1. An elevating structure for an automotive vehicle having a body provided with a horizontal floor vertically spaced above the ground comprising, a combination load-carrying and end gate member adapted to be raised and lowered to and from the level of said floor while disposed in a substantially horizontal rearwardly extending position and moved into a vertical position at one end of the body, a pair of arms swingable in unison, each of said arms having one end pivotally connected to the vehicle at horizontally spaced and aligned points, the other end of one of said arms being pivotally connected to said member, said arms being a part of a first parallelogram linkage system, and a second parallelogram linkage system operatively interconnecting said vehicle and said arms including a section of one of said arms comprising an axially adjustable, elongated rod having one end pivotally connected to the vehicle at a point vertically spaced above the pivotal connection of said arms to the vehicle and its opposite end pivotally connected to the apex of a triangularly-shaped plate, said plate being pivotally connected to said arms at horizontally aligned points, said rod being disposed in a transversely extending plane parallel and spaced from transversely extending planes containing the arms during swinging movement of said arms.

2. An elevating end gate structure for an automotive vehicle having a body provided with a horizontal floor vertically spaced above the ground comprising, a combination load-carrying and end gate member and adapted to be raised and lowered to and from the level of said floor while disposed in a substantially horizontal rearwardly extending position and moved into a vertical position at one end of the body, movable arm means operatively interconnecting said vehicle and said member for raising and lowering said member, a longitudinally extending, horizontally disposed hinging bracket operatively connected and movable in unison with said arm means, said hinging bracket and arm means being part of a parallelogram linkage system, brace means for supporting said member in its rearwardly extending position, said brace means including an articulated link having one end pivotally connected to said bracket and its opposite end pivotally connected to said member at a point horizontally spaced from the connection of said arm means with said member when said member is in its rearwardly extending position, cooperable means on said bracket and said articulated link to limit the pivotal movement therebetween in one direction, and tension spring means extending between said arm means and member and operably connected to said arm means and pivotally connected to said member for biasing said member in an opposite direction to its vertical position, the connection of said spring means to said member being vertically spaced above and horizontally forwardly of the pivotal connection of said arm means with said member when said member is in its rearwardly extending position.

3. An elevating end gate structure for an automotive vehicle having a body provided with a horizontal floor vertically spaced above the ground comprising, a combination load-carrying and end gate member adapted to be raised and lowered to and from the level of said floor while disposed in a substantially horizontal rearwardly extending position and moved into a vertical position at one end of the body, movable arm means operatively interconnecting said vehicle and said member for raising and lowering said member, said movable arm means being a part of a first parallelogram linkage system and including an arm having one end pivotally connected to said member, and a second parallelogram linkage system operatively interconnecting said vehicle and said first parallelogram linkage system, said second parallelogram linkage system including a section of said arm of said movable arm means, link means pivotally connected to said section of said arm at a point horizontally spaced from the pivotal connection of said arm to said member, and a rod having one end pivotally connected to said vehicle and its opposite end pivotally connected to said link means, said rod being disposed in a transversely extending plane parallel and spaced from the transversely extending plane containing said section of said arm during raising and lowering movement of said arm means, and means for adjusting the distance between the pivotal connections of said rod to said vehicle and said link means.

References Cited in the file of this patent

UNITED STATES PATENTS

| | | |
|---|---|---|
| 1,113,191 | Breese | Oct. 13, 1914 |
| 2,390,268 | Penney | Dec. 4, 1945 |
| 2,391,224 | Carter | Dec. 18, 1945 |
| 2,593,240 | Anthony et al. | Apr. 15, 1952 |
| 2,696,923 | Messick | Dec. 14, 1954 |

FOREIGN PATENTS

| | | |
|---|---|---|
| 677,735 | Great Britain | Aug. 20, 1952 |